US006331904B1

(12) United States Patent
Daiber et al.

(10) Patent No.: US 6,331,904 B1
(45) Date of Patent: Dec. 18, 2001

(54) REFLECTION OPTICS REFERENCE BEAM TELESCOPE

(75) Inventors: Andrew J. Daiber, Palo Alto; Mark E. McDonald, Mountain View, both of CA (US)

(73) Assignee: Siros Technologies, Inc., San Jose, CA (US)

( * ) Notice: Subject to any disclaimer, the term of this patent is extended or adjusted under 35 U.S.C. 154(b) by 0 days.

(21) Appl. No.: 09/477,230

(22) Filed: Jan. 4, 2000

Related U.S. Application Data

(63) Continuation of application No. 09/136,032, filed on Aug. 19, 1998, now abandoned, which is a continuation-in-part of application No. 09/116,656, filed on Jul. 16, 1998, now Pat. No. 6,023,365, which is a continuation-in-part of application No. 09/116,647, filed on Jul. 16, 1998, now abandoned, which is a continuation-in-part of application No. 09/116,291, filed on Jul. 16, 1998, now Pat. No. 6,104,511.

(51) Int. Cl.[7] .............................. G03H 1/22; G03H 1/10; G02B 5/32; G02B 17/00; G11C 13/04
(52) U.S. Cl. .................... 359/32; 359/16; 359/10; 359/364; 359/363; 365/124; 365/125
(58) Field of Search ................... 359/10, 16, 32, 359/35, 364, 365, 366, 15, 19; 355/51; 365/124, 125

(56) References Cited

U.S. PATENT DOCUMENTS

| | | |
|---|---|---|
| 3,190,171 | 6/1965 | Reed ................................ 88/1 |
| 3,748,015 | 7/1973 | Offner .............................. 350/55 |
| 4,293,186 | 10/1981 | Offner .............................. 350/27 |
| 4,294,538 * | 10/1981 | Ban ................................. 355/51 |
| 4,796,984 | 1/1989 | Wynne ............................. 350/444 |
| 4,920,220 | 4/1990 | Phaff ............................... 544/90 |
| 5,440,669 | 8/1995 | Rakuljic et al. .................... 359/7 |
| 5,450,218 | 9/1995 | Heanue et al. .................... 359/21 |
| 5,671,073 | 9/1997 | Psaltis et al. ..................... 359/22 |
| 5,886,800 * | 3/1999 | Aprahamian et al. ............. 359/16 |

OTHER PUBLICATIONS

Offner, A., *New concepts in projection mask aligners*, Opt. Eng., vol. 14, No. 2, pp. 130–132, 1975.

* cited by examiner

*Primary Examiner*—Audrey Chang
(74) *Attorney, Agent, or Firm*—Lumen IRS, Inc.

(57) ABSTRACT

A reference beam telescope, which is also referred to as a relay imaging system for a reference beam, using reflection optics is disclosed. The relay imaging system according to the present invention comprises at least one concave mirror and one convex mirror. A reference beam is reflected at least twice by the concave mirror and once by the convex mirror. The output reference beam is collimated if the input reference beam is collimated. This relay imaging system is used in a holographic storage system to deliver the reference beam to the holographic storage medium. In particular, this system can be used for angular multiplexing in a holographic storage system.

33 Claims, 6 Drawing Sheets

TOP VIEW

SIDE VIEW

FRONT VIEW

REFLECTION OPTICS REFERENCE BEAM TELESCOPE

CROSS-REFERENCE TO RELATED APPLICATIONS

This application is a continuation of application Ser. No. 09/136,032 filed Aug. 19, 1998 now abandoned, which is a continuation-in-part claiming priority of application Ser. No. 09/116,647 filed Jul. 16, 1998 now abandoned, both of which are herein incorporated by reference. This patent application is also a continuation-in-part application to two concurrently filed patent applications: "DMD Illumination Coupler", Ser. No. 09/116,656 now U.S. Pat. No. 6,023,365, filed Jul. 16, 1998 by Mark McDonald, and "Reflector-Based Off-Axis Optical System for Holographic Storage" Ser. No. 09/116,291 now U.S. Pat. No. 6,104,511, filed Jul. 16, 1998 by Lambertus Hesselink et. al.

GOVERNMENT RIGHTS CLAUSE

This invention was made with Government support under SBIR grant No. NAS5-33257. The Government has certain rights in this invention.

FIELD OF THE INVENTION

This invention relates generally to a holographic storage and retrieval system, and especially to an optical system which delivers a reference beam to a holographic storage medium.

BACKGROUND

In holographic storage, data is stored in a hologram resulting from the interference of a signal and a reference beam. During storage, both the reference and the signal beams are incident on the storage medium. During retrieval, only the reference beam is incident on the medium. The reference beam interacts with the stored hologram, generating a reconstructed signal beam proportional to the original signal beam used to store the hologram. Relative to conventional magnetic and optical data storage methods, holographic data storage promises high storage densities, short access times, and fast data transfer rates. The widespread use of holographic data storage has been hindered in part by the relative complexity of the specialized components required for storage and retrieval of data.

For information on conventional volume holographic storage see for example U.S. Pat. Nos. 4,920,220, 5,450,218, and 5,440,669. In conventional volume holographic storage, each bit is stored as a hologram extending over the entire volume of the storage medium. Multiple bits are encoded and decoded together in pages, or two-dimensional arrays of bits. Multiple pages are stored within the volume by angular, wavelength, phase-code, or related multiplexing techniques. Each page can be independently retrieved using its corresponding reference beam. The parallel nature of the storage approach allows high transfer rates and short access times, since as many as 106 bits within one page can be stored and retrieved simultaneously.

In a conventional angular multiplexing scheme, the angle between the signal beam and the reference beam is changed. Such a process is normally achieved by a combination of an angularly tunable mirror and an optical relay system, as is shown in FIG. 1. A reference beam 112 is reflected by an angularly tunable mirror 103, such as a galvanometer, in a first position 100. The light spot 102 on the angularly tunable mirror is imaged in the center of a holographic storage crystal 104 by a 4F relay imaging system. The reflected beam 116 passes through two lenses 106 and 108, which have the same focal length F, and interferes with a signal beam 114 in the holographic storage medium 104. The angularly tunable mirror 103 is placed at the focal plane of the lens 106. The distance between the two lenses 106 and 108 is 2F. The center plane 110 between the two lenses 106 and 108 is the Fourier plane of the lens 106. The holographic storage medium 104 is positioned at a distance of F from the lens 108. When the angularly tunable mirror 103 rotates to a second position 101, a second reflected reference beam 118 passes through lenses 106 and 108, enters the holographic storage medium 104, and interferes with a signal beam 114 at the same position and yet a different angle with respect to the beam 116. The relay performance of a conventional refractive optical system is inversely proportional to the range of angles it is designed to relay. This angular multiplexing system is usually space demanding. Furthermore, since the lenses 106 and 108 are not monolithic, an optical alignment procedure is required before use.

U.S. Pat. No. 5,671,073 taught a shift multiplexing method. A spherical wave or a fan of plane waves can be used as the reference which interacts with a signal beam in a holographic storage medium at an angle. In fact, different parts of the reference interact with the signal beam at slightly different angles. The holographic storage medium is shifted at predetermined distances with respect to the signal and reference beams in order to record different pages of data. Different parts of the reference contribute to the writing and reading of different holograms at different displacements. Shift multiplexing can be considered as another form of angular multiplexing.

An imaging system using all reflective optics has been disclosed in the U.S. Pat. No. 3,190,171. The prior art teaches the construction of a viewing device using a relay imaging system. This relay imaging system uses concave and convex mirrors. Similar systems have also been taught in U.S. Pat. Nos. 4,796,984, and 4,293,186. The concave-convex-mirror imaging system has excellent off-axis optical performance. Application of this system to lithography technology has been taught in U.S. Pat. No. 3,748,015, and in A. Offner's article: "New Concepts in Projection Mask Aligners", OPTICAL ENGINEERING, Vol. 14, No. 2, 1975.

SUMMARY

Briefly, and in general terms, the present invention applies the concave-convex mirror imaging system to a holographic storage system. More specifically, the present invention uses concave and convex mirrors to form a reference beam telescope, which delivers a reference beam to a holographic storage medium. This invention makes use of the superior off-axis performance of the concave-convex mirror imaging system to achieve angular multiplexing in holographic storage. Furthermore, the present invention provides a monolithic reference telescope which features high optical performance for collimated reference beam and robustness.

A relay imaging system according to the present invention, which delivers a reference beam to a holographic storage medium, comprises at least one reflective convex mirror and one reflective concave mirror. The concave mirror M1 and the convex mirror M2 have the same mechanical axis. The reflective surfaces of the two mirrors are opposite each other. The concave mirror is normally larger than the convex mirror. An incident beam is reflected at least twice on the concave and at least once on the convex mirror.

In the preferred embodiment, by way of example and not necessarily by way of limitation, the concave mirror and the convex mirror are both spherical. The concave mirror has a center $C_1$ and a radius of curvature $R_1$, and the convex mirror has a center $C_2$ and a radius of curvature $R_2$. Furthermore, $C_1$ and $C_2$ are substantially close to each other. The convex mirror is substantially close to the Fourier surface of the concave mirror.

In order to describe the path of the reference beam, one may divide the reference beam into several portions. A portion R(0) of the reference beam is incident on an area O of an angularly tunable mirror. A portion R(1) of the reference beam extends from the area O to the concave mirror $M_1$. A portion R(2) of the reference beam is reflected by the concave mirror $M_1$, and incident on the convex mirror $M_2$. A portion R(3) of the reference beam is reflected by the convex mirror $M_2$ and incident on the concave mirror $M_1$. A portion R(4) is reflected by the concave mirror $M_1$, and incident on the storage medium.

A collimated reference beam incident on the concave mirror $M_1$ is focused on the surface of the convex mirror $M_2$, reflected by the convex mirror $M_2$ and then reflected by the concave mirror for the second time and re-collimated by the concave mirror, and finally incident on the holographic storage medium. The holographic storage medium is positioned so that the area O of the angularly tunable mirror is imaged in the center of the holographic medium. A signal beam interacts with the reference beam R(4) in the holographic storage medium to create a hologram. When the angularly tunable mirror is tuned angularly, the position of the image of area O inside the storage medium does not change, yet the incident angle of the reference beam R(4) on the storage medium changes. As a consequence, the angle between the reference beam and the signal beam changes, and angular multiplexing is achieved.

In the most preferred embodiment, the concave mirror and the convex mirror are incorporated into a monolithic piece, having the back surface of the piece as the concave mirror, and a part of the front surface as the convex mirror. The entrance surface and the exit surface of the monolithic piece for the reference beam are flat in order to optimize the wavefront quality of the transmitted reference beam. This monolithic piece is also called a monolithic reference beam telescope in this application.

The optical relay imaging system for the holographic system according to the present invention is very compact, compared with the conventional 4F relay imaging system. Furthermore, undue alignment effort is not needed if a monolithic reference beam telescope is used. Any beam distortion, such as spherical aberration, can be compensated by pre-adjusting the thickness of the monolithic piece, i.e., the distance between the concave mirror and the convex mirror. It is also feasible to adjust the radius of curvature of each mirror in order to optimize the optical quality of transmitted reference beam.

A detailed explanation of the invention is contained in the detailed specification with reference to the appended drawing figures.

DETAILED DESCRIPTION

Figure 1:
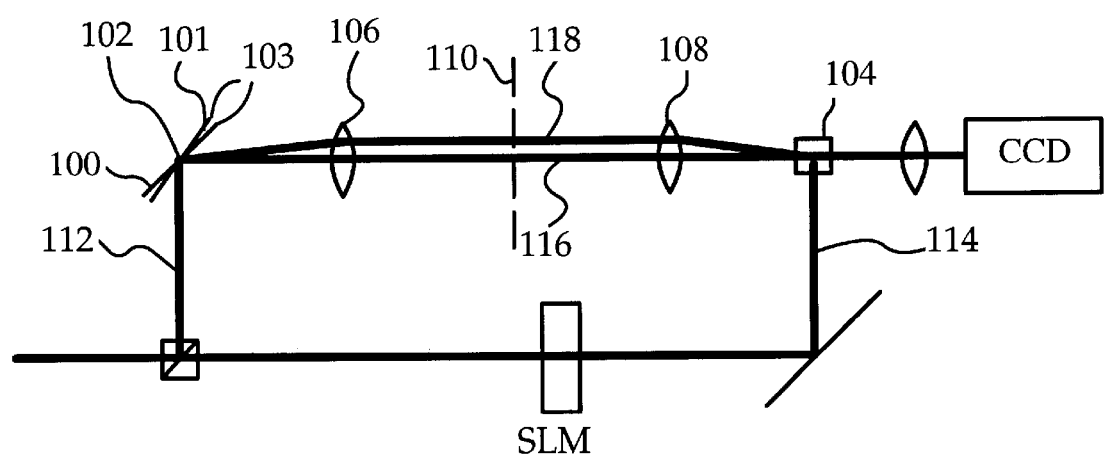
FIG. 1 is a schematic view of relay imaging system for angular multiplexing used in a holographic storage system according to the prior art.
Figure 2:
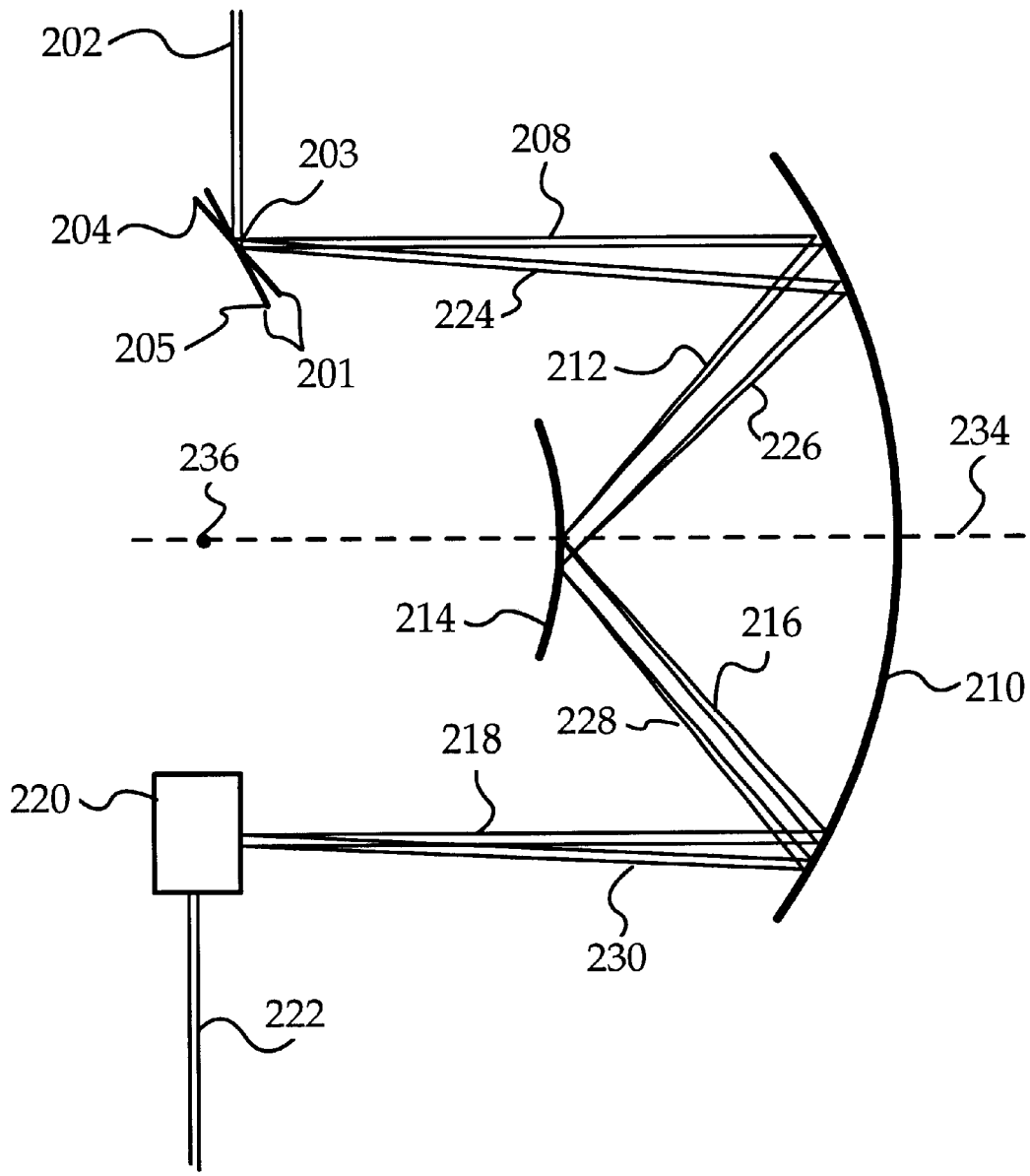
FIG. 2 As a schematic view showing the principles of a reference beam relay imaging system used in a holographic storage system according to the invention.

FIG. 2 is a schematic view showing the principles of using a reference beam relay imaging system in a holographic storage system according to the present invention.

In the preferred embodiment, a concave mirror 210 and a convex mirror 214 are both spherical mirrors. (The concave mirror 210 and the convex mirror 214 refer to the concave mirror $M_1$ and the concave mirror $M_2$ described in the summary section.) The convex mirror 214 is smaller than the concave mirror 210. They are positioned so that they have the same mechanical axis 234. Their reflective surfaces are opposing each other.

The convex mirror 214 is positioned at the focal surface of the concave mirror 210. In the preferred embodiment, the centers of curvature $C_1$ and $C_2$ of the concave mirror 210 and the convex mirror 214 coincide at a center 236, and the radius of curvature of the concave mirror 210 is two times the radius of curvature of the convex mirror 214.

An angularly tunable mirror 201 is positioned away from the mechanical axis 234. The angularly tunable mirror 201 is used to direct a reference beam 202 to the concave mirror 210. A holographic storage medium 220 is positioned such that an area 203 on the angularly tunable mirror 201 is imaged in the center of the holographic storage medium 220.

The reference beam 202 (identified as R in the Summary) is divided into portions R(0), R(1), R(2), R(3) and R(4) according to the descriptions in the summary section. For simplicity purposes, these portions R(0), . . . , R(4) are further labeled by reference numbers in FIG. 2. Reference beam 202 corresponds to the portion R(0). Light beams 208 and 224 both correspond to the portion R(1). Light beams 226 and 212 both correspond to the portion R(2). Light beams 216 and 228 both correspond to the portion R(3). Light beams 218 and 230 both correspond to the portion R(4). Furthermore, the area 203 refers to the area O on which the reference beam R(0) is incident. Specifically, the reference beam 202 is incident on the area 203 of the angularly tunable mirror 201 in a first position 204. The reference beam 202 is collimated. The light beam 208 is the reflected beam of the reference beam 202. The light beam 208 is reflected by concave mirror 210 to form the light beam 212. The light beam 212 is focused on the surface of the convex mirror 214. The light beam 212 is further reflected by the convex mirror 214 to form the light beam 216. The light beam 216 is diverging. The light beam 216 is reflected by the concave mirror 210 to form the light beam 218. The light beam 218 is a collimated light beam. The light beam 218 is incident on the holographic storage medium 220. A signal beam 222 interferes with the light beam 218 in the center of the holographic storage medium 220 to form a hologram. The holographic storage medium 220 is positioned such that the area 203 is imaged in the center of the storage medium 220.

When the angularly tunable mirror 201 is moved to a second position 205, the reference beam 202 is still incident on the area 203 of the angularly tunable mirror 201. The reference beam 202 is reflected by the angularly tunable mirror 201 to form the light beam 224. The light beam 224 is reflected by the concave mirror 210 to form the light beam 226. The light beam 226 is reflected by the convex mirror 214 to form the light beam 228. The light beam 228 is reflected by the concave mirror 210 to form a light beam 230. The light beam 230 is incident on the holographic storage medium 220 at an angle which is different from the incident angle of the light beam 218. Yet the light beam 230 interferes with the signal beam 222 at the same position inside the holographic storage medium 220.

Angularly tunable mirror 201 and the holographic storage medium 220 are located at two positions which are symmetric with respect to the mechanical axis 234 and the center 236. The reference beam telescope formed by the concave mirror 210 and the convex mirror 214 provides a unit magnification image of the angularly tunable mirror 201 in the center of the holographic medium 220. It should be noted that in order to form a unit image of the angularly tunable mirror 201 inside the holographic storage medium 220, the mirror 201 and the medium 220 need to be placed at positions which are symmetric with respect to the center 236.

Figure 3A:
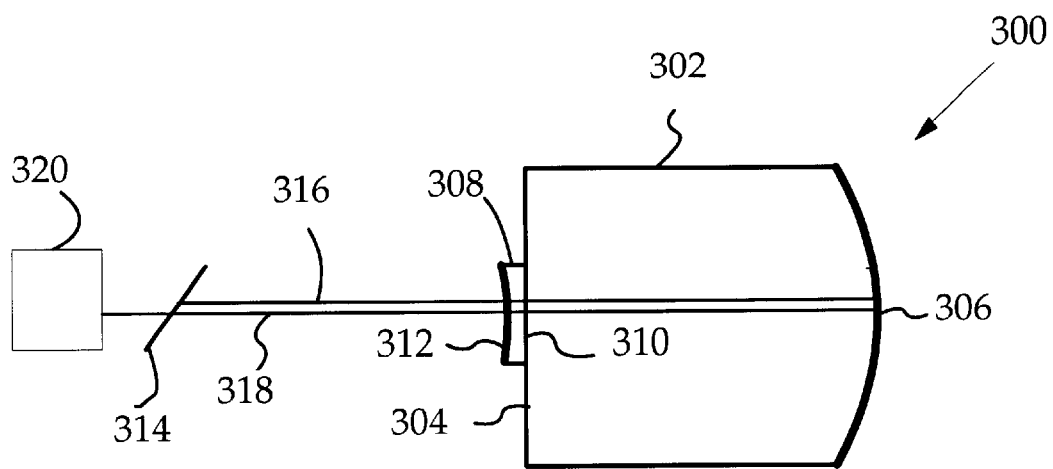
FIGS. 3A–3F are schematics of a preferred embodiment of a monolithic reference beam telescope for angular multiplexing used in a holographic storage system according to the present invention.
Figure 3B:
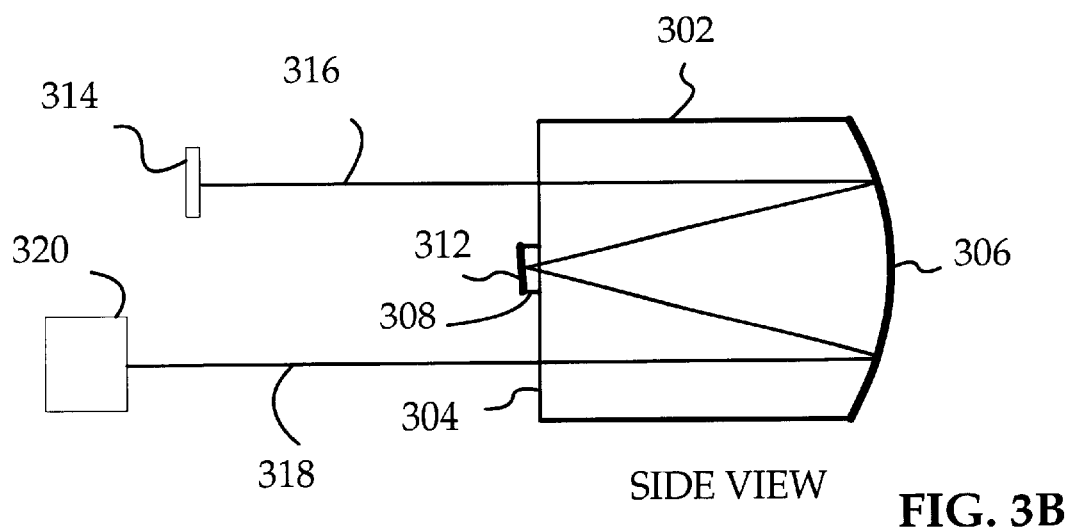
Figure 3C:
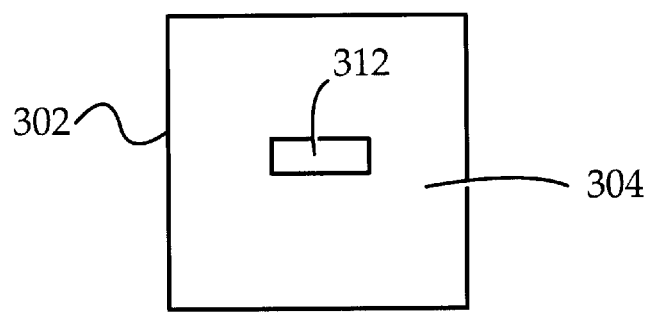

FIGS. 3A–3C show a monolithic piece 300 incorporating the concave mirror 210 and convex mirror 214 of FIG. 2. FIG. 3A is a top view of the monolithic piece 300. FIG. 3B is a side view of the monolithic piece 300, and FIG. 3C is a front view of monolithic piece 300.

A first transparent medium 302 has a planar front surface 304 and a spherical back surface 306. The spherical back surface 306 is coated with reflective material to form a concave mirror 306. A second transparent medium 308 has a planar surface 310 and a spherical surface 312. The spherical surface 312 is coated with a reflective material to form a convex mirror 312. Transparent medium 308 is smaller than transparent medium 302. The planar surface 310 of the transparent medium 308 is attached to the planar front surface 304 to form a monolithic system. The mechanical axis (see axis 234 of FIG. 2) of the convex mirror 312 and the mechanical axis of the concave mirror 306 coincide. The convex mirror 312 is at the focal surface of the concave mirror 306.

An angularly tunable mirror 314 is positioned off the mechanical axis. The angularly tunable mirror directs a reference beam 316 to the monolithic piece 300. The reference beam 316 is incident on the front planar surface 304 which act as an input of the monolithic piece 300. The output beam 318 exits the front planar surface 304, and is incident on a holographic storage medium 320. The relative positions of the angularly tunable mirror 314, the holographic storage medium 320 and the monolithic piece 300 are such that the angularly tunable mirror 314 is imaged by the monolithic piece 300 in the center of the holographic storage medium 320. An important feature of the monolithic piece 300 is that the output beam 318 will be collimated if the input beam 316 is collimated.

More specifically, both transparent medium 302 and transparent medium 308 are made from a transparent material, preferably BK7 glass. The concave mirror 306 and the convex mirror 312 are both coated by a reflective material, preferably aluminum. The planar front surface 304 is further coated with an anti-reflection coating for normal angle incidence at a pre-determined wavelength.

The angularly tunable mirror 314 is placed off axis and away from the center of curvature of the concave mirror 306 and the convex mirror 312. This monolithic piece relay system 300 can image a 5 mm reference beam over full angle galvanometer swing of 45 degrees, while maintaining the divergence of the output beam 318 to less than 4 milliradians divergence. Therefore, output beam 318 maintains a nearly plane wavefront. The monolithic nature assures that tolerances will be kept over a long period of time. The all spherical design ensures low cost of production. The compact implementation potentially allows all of the relay optics to fit inside a small space.

Figure 3D:
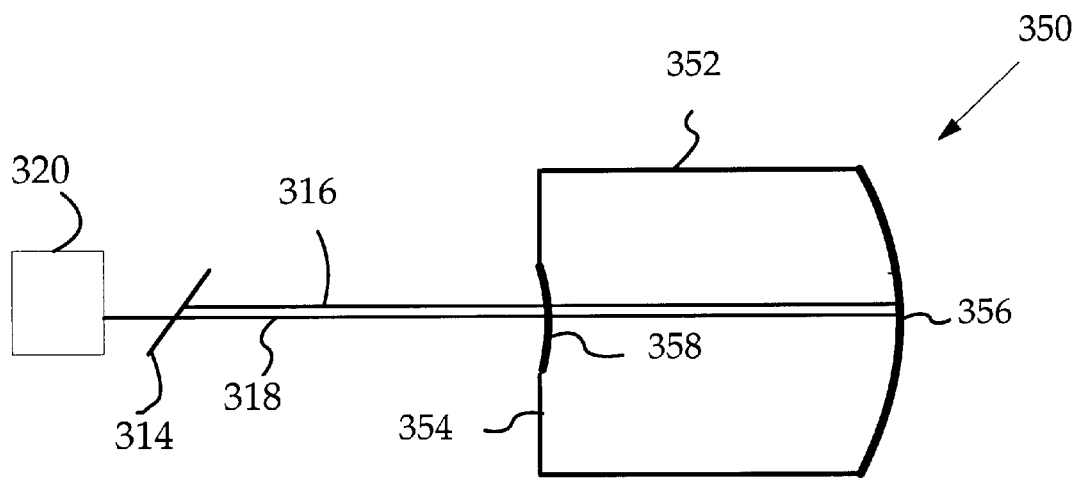
Figure 3E:
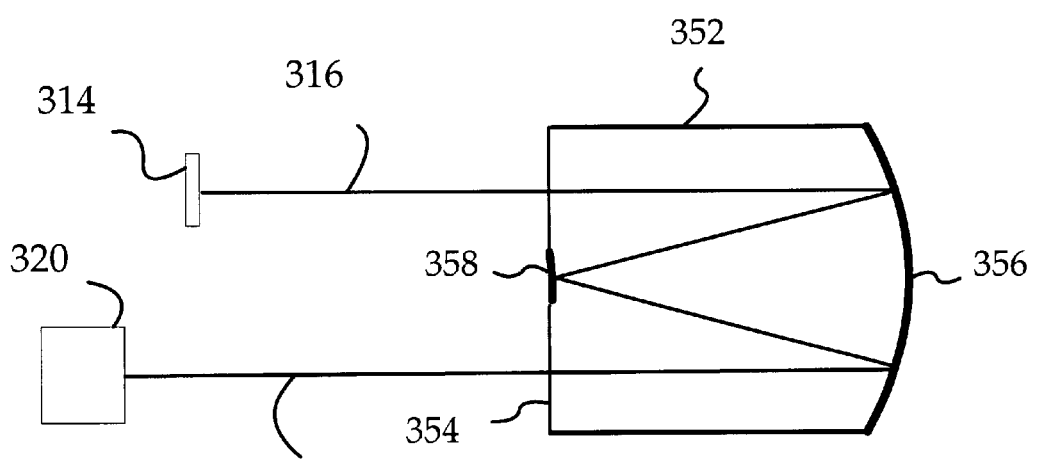
Figure 3F:
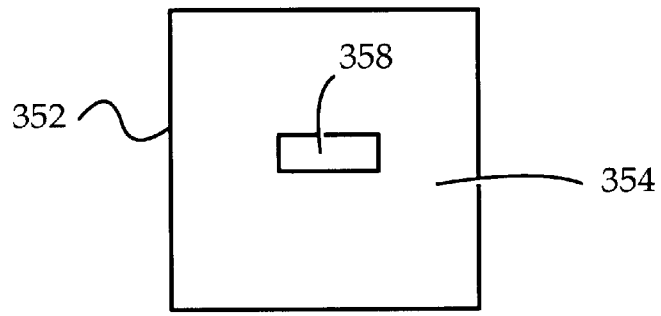

FIGS. 3D–3F illustrate the most preferred embodiment incorporating a monolithic piece 350 according to the present invention. The monolithic piece 350 comprises a transparent medium 352 which has a coated spherical back surface 356 as the concave reflector. The front surface 354 is flat except for the center part 358, which is processed to form a spherical surface. The center part 358 is coated to form the convex reflector 358. FIG. 3D shows a top view of the monolithic piece 350. FIG. 3E shows a side view of the monolithic piece 350, and FIG. 3F is a front view.

Similar to FIGS. 3A–C, an angularly tunable mirror 314 is positioned off the mechanical axis. The angularly tunable mirror 314 directs a reference beam 316 to the monolithic piece 350. The reference beam 316 is incident on the front planar surface 354 which acts as an input of the monolithic piece 350. The output beam 318 exits the front planar surface 354, and is incident on a holographic storage medium 320. The relative positions of the angularly tunable mirror 314, the holographic storage medium 320 and the monolithic piece 350 are such that the angularly tunable mirror 314 is imaged by the monolithic piece 350 in the center of the holographic storage medium 320.

Figure 4:
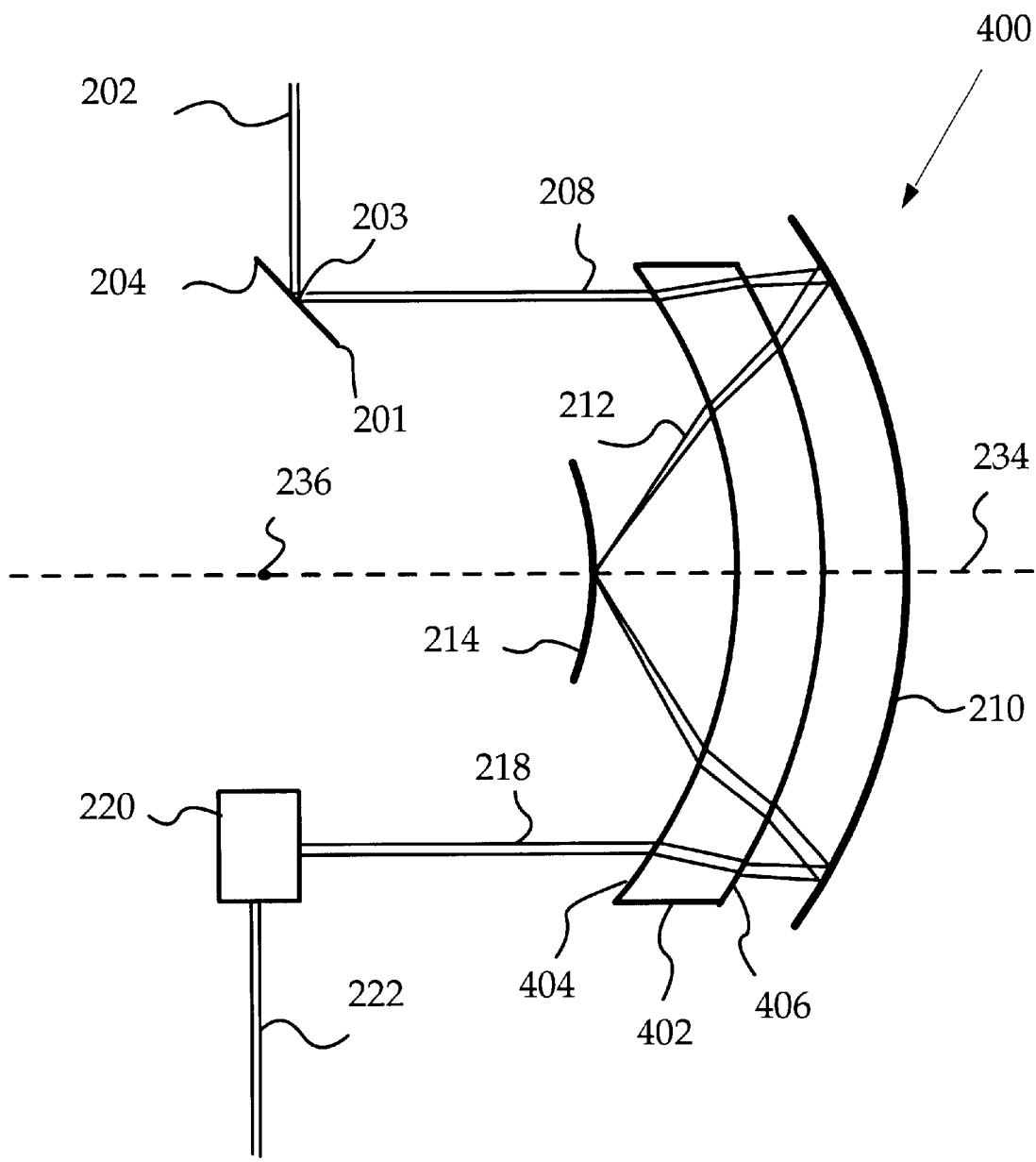
FIG. 4 is a schematic view of a reference beam telescope having an aberration corrector.

FIG. 4 shows a variation of the embodiment described in FIG. 2. The reference beam telescope 400 further includes an aberration corrector 402. The aberration corrector 402 is characterized by an outer surface 404, an inner surface 406, and a material having a refractive index n. The outer surface 404 is spherical having a center $C_o$ and a radius of curvature $R_o$, and the inner surface 406 is spherical, having a center $C_i$ and a radius of curvature $R_i$. The center $C_o$ and the center $C_i$ substantially coincide with the center 236 of the concave mirror 210 and the convex mirror 214. The radius of curvature of the concave mirror 210 and the convex mirror 214 are chosen such that the convex mirror 214 is at the focal plane of the concave mirror 210.

In this embodiment, the aberration corrector 402 is positioned between the concave mirror 210 and the convex mirror 214. The aberration corrector 402 can also be positioned between center 236 and convex mirror 214. In another embodiment, the outer surface 406 can be coated with a reflective material to form the concave mirror 210. Similarly, the inner surface 404 can be coated with a reflective material to form the convex mirror 214.

The aberration corrector 402 is used to correct the spherical aberration of the concave mirror 210 and the convex mirror 214. A person of average skill in the art will be able to determine a suitable thickness of aberration corrector 402 and suitable radii of curvature of the inner and outer surfaces 404 and 406.

Figure 5A:
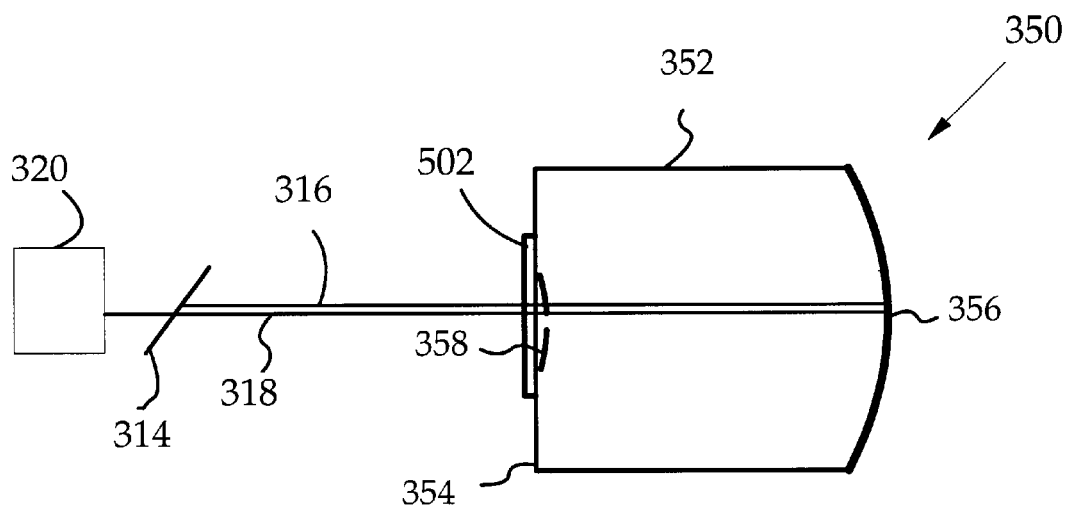
FIGS. 5A–5C are schematic views of a reference beam telescope incorporating a cylindrical lens to achieve shift multiplexing.
Figure 5B:
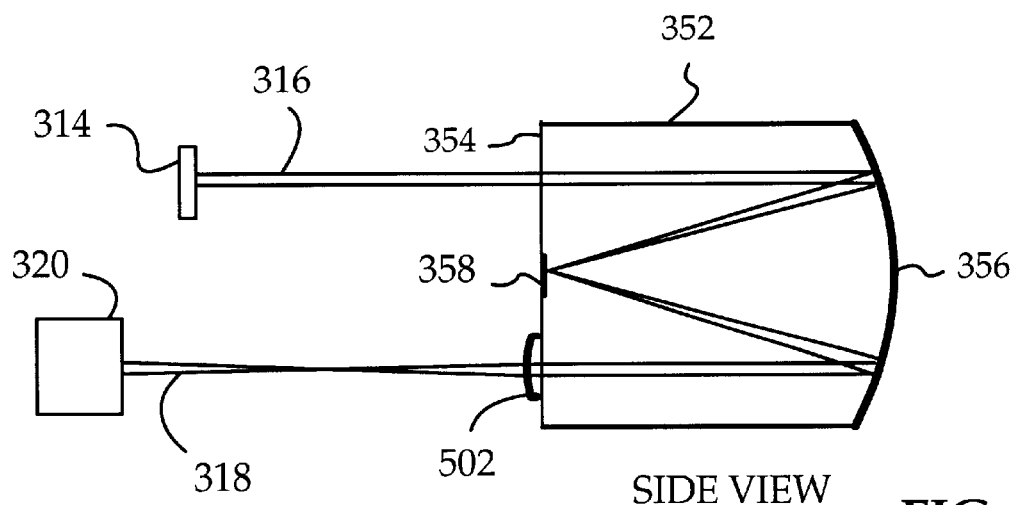
Figure 5C:
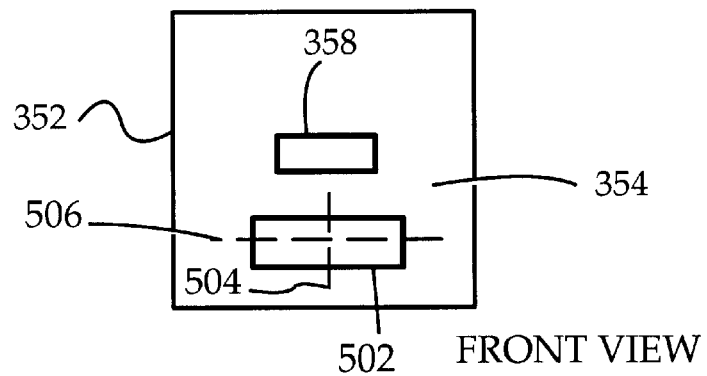

FIGS. 5A–5C are schematic views showing a reference beam telescope incorporating a cylindrical lens 502 in order to achieve shift multiplexing. This embodiment is a variation of the most preferred embodiment shown in FIGS. 3D–3F. The cylindrical lens 502 has focusing power along one axis 504 and no focusing power along another axis 506. The focal length of the cylindrical lens is one half of the distance between the surface 354 and the holographic storage medium 320. The cylindrical lens 502 is attached to the surface 354 so that the cylindrical lens 502 and the reference beam telescope form an integral piece. The output beam 318 passes through cylindrical lens 502, focuses to a line along a direction parallel to the axis 506, expands and enters the holographic storage medium 320. As the angularly tunable mirror 314 tunes to different angles, the exiting position of the output beam 318 moves along the axis 506 on the lens 502. The angle between the center ray of the reference beam 318 and the signal beam varies correspondingly. Thus, this embodiment retains the angular multiplexing ability of the monolithic piece 350. In addition, one dimensional shift multiplexing can be achieved because the reference beam 318 is incident on the holographic medium 320 at different angles along an axis which is parallel to the axis 504. In this case, shift multiplexing is achieved by moving the holographic storage medium 320 along the direction which is parallel to the axis 504. This embodiment can greatly increase the capacity of the holographic system for a storage medium by integrating angular and shift multiplexing into one system.

SUMMARY, RAMIFICATIONS, AND SCOPE

The presented embodiments are only illustrative of some of the many types of reference beam relay imaging systems which can be used according to the invention to deliver a reference beam to a holographic storage medium, and to achieve angular multiplexing in a holographic storage system. The dimensions of the setup will be different, according to specific applications and specific physical constraints to the system.

Therefore, the scope of the invention should be determined, not by examples given, but by the appended claims and their legal equivalents.

What is claimed is:

1. A holographic data storage and retrieval system comprising:
   a) a holographic storage medium;
   b) an optical system comprising a concave mirror $M_1$ and a convex mirror $M_2$, having their reflective surfaces opposing each other;
   c) a reference beam R which propagates through said optical system and is incident on said storage medium, wherein said reference beam R comprises sequential portions:
      a portion R(1) which is incident on said concave mirror $M_1$;
      a portion R(2) which is reflected by said concave mirror $M_1$, and is incident on said convex mirror $M_2$;
      a portion R(3) which is reflected by said convex mirror $M_2$ and is incident on said concave mirror $M_1$;
      a portion R(4) which is reflected by said concave mirror $M_1$, and is incident on said storage medium; and
   d) a signal beam which bypasses said optical system, and is incident on said storage medium, said signal beam interfering with said reference beam R in said storage medium.

2. The system in claim 1 wherein said concave mirror $M_1$ and said convex mirror $M_2$ have a same mechanical axis which is the axis of symmetry of said concave mirror $M_1$ and said convex mirror $M_2$.

3. The system of claim 2 further comprising a cylindrical lens, having a predetermined focal length $F_c$, a focusing axis and a non-focusing axis which is substantially perpendicular to said focusing axis, wherein a portion R(4) of said reference beam R propagates through said cylindrical lens and is incident on said holographic storage medium.

4. The system of claim 3 wherein said cylindrical lens is positioned such that a distance between said cylindrical lens and said holographic medium equals approximately $2F_c$.

5. The system in claim 1 wherein said concave mirror $M_1$ is spherical, having a center $C_1$ and a radius of curvature $R_1$, and said convex mirror $M_2$ is spherical, having a center $C_2$ and a radius of curvature $R_2$.

6. The system in claim 5 wherein said center $C_1$ and said center $C_2$ substantially coincide.

7. The system in claim 5 wherein said radius $R_1$ is greater than said radius $R_2$.

8. The system in claim 5 wherein said radius $R_1$ equals $2R_2$.

9. The system in claim 1 further comprising an optical surface having a portion O wherein said portion R(1) of said reference beam propagates from said portion O to said concave mirror M1.

10. The system in claim 9 wherein said optical surface is a reflective surface.

11. The system in claim 10 wherein said reflective surface is part of an angularly tunable mirror.

12. The system in claim 9 wherein said optical surface is a refractive surface.

13. The system in claim 9 wherein: an image of said portion O is inside said holographic storage medium.

14. The system of claim 1 further comprising a first transparent medium, wherein a first back surface of said first transparent medium comprises said concave mirror $M_1$, and a first front surface of said first transparent medium is substantially flat.

15. The system of claim 14 further comprising a second transparent medium wherein a second front surface of said second transparent medium comprises said convex mirror $M_2$, a second back surface of said second transparent medium is flat, said second back surface is attached to said first front surface, and said second transparent medium is substantially smaller than said first transparent medium.

16. The system of claim 15 wherein said first transparent medium and said second transparent medium are parts of a monolithic piece.

17. The system of claim 1 further comprising an aberration corrector positioned so that said sequential portion R(1) of said reference beam R propagates through a first portion of said aberration corrector before said sequential portion R(1) is reflected by said concave surface $M_1$, said aberration corrector being characterized by an outer surface, an inner surface, and a material between said outer surface and said inner surface.

18. The system of claim 17 wherein said sequential portion R(4) of said reference beam R propagates through a second portion of said aberration corrector.

19. The system of claim 18 wherein said aberration corrector is between said concave mirror $M_1$ and said convex mirror $M_2$.

20. The system of claim 18 wherein said outer surface is spherical, characterized by a center $C_o$ and a radius of curvature $R_o$, and said inner surface is spherical, characterized by a center $C_i$ and a radius of curvature $R_i$, and $R_o \geq R_i$.

21. The system of claim 20 wherein said center $C_o$ and said center $C_i$ substantially coincide.

22. The system of claim 20 wherein said center $C_o$ and said center $C_i$ substantially coincide with a center of said concave mirror $M_1$.

23. The system of claim 18 wherein said outer surface has a reflective portion, and said reflective portion comprises said concave mirror $M_1$.

24. The system of claim 18 wherein said inner surface has a reflective portion, and said reflective portion comprises said convex mirror $M_2$.

25. A method for delivering a reference beam R to a holographic storage medium comprising:

a) providing said holographic storage medium;

b) providing an optical system having a convex mirror $M_2$ and a concave mirror $M_1$, said concave mirror $M_1$ and said convex mirror $M_2$ having reflective surfaces opposing each other;

c) providing a reference beam R, which propagates through said optical system, and is incident on said storage medium, said reference beam R comprising sequential portions:

a portion R(1) which is incident on said concave mirror $M_1$;

a portion R(2) which is reflected by said concave mirror $M_1$ and incident on said convex mirror $M_2$;

a portion R(3) which is reflected by said convex mirror $M_2$ and incident on said concave mirror $M_1$;

a portion R(4) which is reflected by said concave mirror $M_1$ and incident on said holographic storage medium; and d) providing an angularly tunable mirror wherein said sequential portion R(1) of said reference beam R propagates from a portion 0 of said angularly tunable mirror to said concave mirror $M_1$.

26. The method of claim 25 further comprising imaging said portion O of said angularly tunable mirror inside said storage medium by said concave mirror $M_1$ and said convex mirror $M_2$.

27. The method of claim 26 further comprising changing an incident angle of said sequential portion R(4) of said reference beam R inside said storage medium by changing an orientation of said angularly tunable mirror.

28. The method of claim 25 wherein said concave mirror $M_1$ is spherical, having a center $C_1$ and a radius of curvature $R_1$, and said convex mirror $M_2$ is spherical, having a center $C_2$, and radius of curvature $R_2$, wherein $R_1$ is greater than $R_2$.

29. The method of claim 25 wherein the act of providing an optical system further comprises establishing a substantially transparent medium wherein a spherical back surface of said substantially transparent medium comprises said concave mirror $M_1$.

30. The method of claim 29 further comprising preadjusting the thickness of said transparent medium for minimizing a spherical aberration of said concave mirror $M_1$.

31. The method of claim 25 wherein the act of providing an optical system further comprises providing a first substantially transparent medium having a first front surface and a first back surface, wherein said first front surface is flat, and said first back surface, comprises said concave mirror $M_1$.

32. The method of claim 31 further comprising providing a second substantially transparent medium having a second front surface and a second back surface, wherein said second front surface comprises said convex mirror $M_2$, and said second back surface is attached to said first front surface of said first substantially transparent medium.

33. The method of claim 32 further comprising preadjusting a thickness of a medium to minimize the spherical aberration, said medium selected from the group consisting of said first transparent medium and said second transparent medium.

\* \* \* \* \*